United States Patent [19]

Bartmann et al.

[11] Patent Number: 4,868,283

[45] Date of Patent: Sep. 19, 1989

[54] PROCESS FOR THE PRODUCTION OF POLYPHENYLENE ETHERS WITH REDUCED INHERENT COLOR

[75] Inventors: Martin Bartmann, Recklinghausen; Wilfried Ribbing, Dorsten, both of Fed. Rep. of Germany

[73] Assignee: Hüls Aktiengesellschaft, Marl, Fed. Rep. of Germany

[21] Appl. No.: 55,504

[22] Filed: May 29, 1987

[30] Foreign Application Priority Data

Aug. 29, 1986 [DE] Fed. Rep. of Germany ....... 3629444

[51] Int. Cl.$^4$ ................................................ C08F 6/00
[52] U.S. Cl. .................................... 528/480; 528/212; 528/214; 528/215; 528/216; 528/217; 528/218
[58] Field of Search ............... 528/480, 215, 218, 212, 528/214, 216, 217

[56] References Cited

U.S. PATENT DOCUMENTS 4,537,948 8/1985 Bartmann et al. ................. 528/218
4,558,119 12/1985 Yamashita et al. ................. 528/218

FOREIGN PATENT DOCUMENTS 930992 7/1963 United Kingdom ............... 528/213

Primary Examiner—John Kight
Assistant Examiner—M. L. Moore
Attorney, Agent, or Firm—Oblon, Spivak, McClelland, Maier & Neustadt

[57] ABSTRACT

A process for the production of polyphenylene ethers with reduced inherent color by the addition of a boron compound after the termination of the oxidative coupling reaction and removal of the metallic catalyst residues.

9 Claims, No Drawings

PROCESS FOR THE PRODUCTION OF POLYPHENYLENE ETHERS WITH REDUCED INHERENT COLOR

BACKGROUND OF THE INVENTION

1. Field of the Invention

The invention relates to a process for the production of polyphenylene ethers which have a low content of components which absorb visible light. More specifically, it relates to the production of polyphenylene ethers by the oxidative coupling of phenols in the presence of metal amine complexes, followed by the addition of boron containing reducing agents.

2. Discussion of the Background

Polyphenylene ethers represent a family of technically valuable synthetic materials, particularly in combination with impact-resistant modified polystyrene (see, e.g., U.S. Pat. No. 3,306,875).

Polyphenylene ethers are usually produced by the oxidative coupling of monovalent phenols in the presence of catalysts, such as metal amine complexes, particularly copper amine complexes in solution. Preferred solvents are aromatic hydrocarbons, such as toluene, optionally in a mixture with aliphatic alcohols, such as methanol. At the end of th self-condensation, the reaction mixture contains the desired polyphenylene ether, the catalyst complex, nonconverted phenol, oligomers and colored by-products, such as tetramethyldibenzoquinone or dimethylbenzoquinone (see U.S. Pat. No. 4,060,514, column 2, lines 25–34). The desired polyphenylene ethers also obviously contain visible light absorbing chromophores (see Macromol. Chem. 180, 2875–82 (1979)).

The reaction is usually terminated by inactivation of the catalyst. This is done, for example, by the addition of aqueous solutions of inorganic or organic acids as described in DE-OS 21 05 372. Also used are polyaminocarboxylic acids (see DE-OS 23 64 319) or other chelating agents, such as tri(carboxymethyl)amine, its sodium salts or ethylenediaminetetraacetic acid and its sodium salts (see DE-OS 25 32 477). The latter may also be in combination with quaternary ammonium salts (see U.S. Pat. No. 4,026,870). Apart from terminating the oxidative self-condensation, the addition of complexing agents also provides for the most complete possible removal of the catalyst from the polyphenylene ether, as this type of contamination leads to a deterioration of the overall properties of the polymers.

If direct isolation methods (see DE-OS 33 37 629 and EP-PS 0 126 972) are used for the isolation of polyphenylene ethers, it is usually necessary to employ additional measures in order to stabilize the polyphenylene ether solutions against a molecular weight loss and to reduce the content of colored by-products. In DE-OS 26 16 746 it is suggested to treat the polymer solution with reducing agents, such as sodium dithionite or hydrazine. However, in most cases this measure is not sufficient to achieve stabilization for long periods of time. In DE-OS 24 30 130 and OS 27 54 887 and U.S. Pat. No. 4,060,514 improved procedures are described, whereby, apart from the reducing agents, additional bivalent phenols or phase transfer catalysts, such as quatenary ammonium salts are used. Advantageous procedures are also decribed in DE-OS 33 32 377 and OS 34 42 141.

All these procedures have the disadvantage that, while they reduce the low-molecular weight contaminants and the polymer bound colored chromophores, they do not provide for irreversible removal or blockage. Thus, the colored byproducts can be reformed after the use or destruction of the reducing agent. This is the case in particular for colored defects built into the polymer chain. It is not sufficient to adsorptively remove the colored low-molecular weight contaminants for the production of usable molding compounds on the basis of polyphenylene ethers as described in U.S. Pat. No. 4,391,950, Example 3. Only the addition of benzoic acid anhydride (U.S. Pat. No. 4,391,950, column 5, lines 46–57) produces usable molding compounds which are stable at temperatures of 300° C. However, this is based on a methanol precipitated polyphenylene ether powder (see example 2) or crumbs (by hot water crumbling, see example 1). In direct isolation procedures, as described, for example, in DE-OS 33 37 629 or EP-PS 0 126 972, it is shown, however, that these measures are also not sufficient.

SUMMARY OF THE INVENTION

Accordingly, one object of the present invention is to provide a method for producing polyphenylene ethers which have a low content of components which absorb visible light.

A further object of the invention is to provide a method in which colored by-products do not reform after the use or destruction of a reducing agent.

These and other objects which will become apparent from the following specification have been achieved by the present process for producing polyphenylene ethers with a low content of visible light absorbing components, which comprises the steps of (i) oxidatively coupling a phenol in the presence of a catalyst comprising a metal-amine complex, (ii) terminating the coupling reaction, (iii) removing the catalyst from the coupling reaction solution, and (iv) adding a boron-containing reducing agent to the coupling reaction solution.

DETAILED DESCRIPTION OF THE PREFERRED EMBODIMENTS

It has now been found that a polyphenylene ether with little coloring is obtained if certain borane compounds are added to the PPE solutions, which are obtained after the removal of the metallic catalyst remnants and the thus treated solutions are processed in the usual manner, for example by multi-step degassification according to the German patent application P 36 00 754.4. In particular, temperatures up to 330° C. have no negative effect on the color and quality of the polymers obtained. In the cases in which the PPE solution was treated with a reducing agent the procedure brings considerable improvements. The molding compound is suitable for the production of light colored molded parts which are required for use particularly in the electric/electronic area and which can only be obtained through expensive precipitation processes for polyphenylene ether resin.

Procedures for the production of polyphenylene ethers are well known in the art. See for example DE-OS 32 24 692, OS 32 24 691, OS 33 13 864, OS 33 32 377, OS 33 37 629, OS 34 19 601, OS 34 42 141 and the literature cited in these publications.

Preferred as polyphenylene ethers are, in particular, polyethers based on 2,6-dimethylphenol, in which the ether oxygen of one unit is bound to the benzene ring of the adjoining unit. Preferably, at least 50 units are present and bonded to each other in this manner.

Other o,o'-dialkylphenols are also suitable if their alkyl substituents contain not more than 6 carbon atoms, an the alkyl group is not attached to the aromatic ring through a tertiary carbon atom. Also suitable are phenols which are substituted only in one ortho position by a tertiary alkyl residue, particularly a tertiary butyl residue. Each of these monomeric phenols can be substituted in the 3-position, and optionally also in the 5-position, by a methyl group. It is also possible to use mixtures of the monomeric phenols.

After the termination of the oxidative coupling reaction by a known method, the metallic catalyst is removed. The remaining organic solution of the polyphenylene ether is then treated with one of the following boron compounds:

(1) diborane ($B_2H_6$);

(2) alkylated dimeric boranes with the formula $(BH_2R)_2$ where R stands for an alkyl group with 1–6 carbon atoms; or (3) addition compounds of $BH_3$ with
  (a) dimethylsulfide
  (b) furan
  (c) morpholine
  (d) pyridine
  (e) ammonia
  (f) a primary, secondary or tertiary aliphatic amine with 1–12 carbon atoms
  (g) triphenylphosphine, or
  (h) a trialkylphosphine with 1–12 carbon atoms.

Particularly preferred are the addition compounds according to (3f), more particularly those with trimethylamine or triethylamine. 0.05 to 5%, preferably 0.1 to 2% of the boron compound are used relative to the weight of the polyphenylene ether to be treated. They are added either without solvent or dissolved in solvents, such as toluene, tetrahydrofuran or chlorobenzene and allowed to react. In general, reaction times between 1 minute and 60 minutes are sufficient.

The solutions are further treated in the usual manner. It is particularly preferred to further treat the solution by the "Procedure for the concentration of PPE solutions" described in the German patent application P 36 00 754.

Other features of the invention will become apparent in the course of the following descriptions of exemplary embodiments which are given for illustration of the invention and are not intended to be limiting thereof.

EXAMPLES

Examples 1.1.–1.5 and Comparison Examples A and B

A solution of 10% poly(2,6-dimethyl-1,4-phenylene ether) in toluene, produced and purified according to Example 1 in DE-OS 33 32 377, was combined with the additives listed in Table 1. Subsequently, the concentration of solids was increased to 50% by weight by distillation under normal pressure. The resulting product was heated to 300° C. for 30 minutes in a stainless steel autoclave. After cooling, a 2% solution was prepared in chloroform and the absorption determined at 350, 420 and 550 nm in a 1 cm cell.

TABLE 1

| Ex. no. | Additive | parts/100 parts PPE resin | absorption $\left(\frac{Io}{\log} I\right)$ at 350 nm | 420 nm | 500 nm |
|---|---|---|---|---|---|
| 1.1 | borane-trimethylamine complex $BH_3.N(CH_3)_3$ | 1 | 0.27 | 0.12 | 0.01 |
| 1.2 | borane-tert.-butylamine complex $BH_3.H_2NC(CH)_3$ | 1 | 0.31 | 0.14 | 0.03 |
| 1.3 | borane-dimethylsulfide complex | 1 | 0.25 | 0.11 | 0.01 |
| 1.4 | borane-pyridine complex | 1 | 0.28 | 0.1 | 0.01 |
| 1.5 | borane-triphenylphosphine complex | 1 | 0.26 | 0.12 | 0.01 |
| A* | benzoic acid anhydride | 1 | 1.2 | 0.35 | 0.05 |
| B | — | — | 1.7 | 0.6 | 0.12 |

*Comparison Example A corresponds to U.S. Pat. No. 4,391,950.

Example 2

A PPE solution (according to Example 1 of DE-OS 33 32 377) was decolored by reduction with sodium dithionite and the polymers isolated by precipitation with methanol, according to Example 1 of U.S. Pat. No. 4,060,514. A 1% solution of this PPE resin showed an absorption at 420 nm of 0.06, in a 1 cm cell.

To simulate the direct isolation by concentration, a 50% toluene solution of this PPE resin was mixed with 1% by weight $BH_3.N(CH_3)_3$ and heated to 300° C. for 30 minutes. The UV absorption of the product obtained is shown in Table 2.

Comparison Example C

A PPE solution was prepared according to Example 2. In contrast to Example 2, the PPE resin was not mixed with a boron compound.

Example 3

A PPE solution (according to Example 1 of DE-OS 33 32 377) was decolored by reductn with hydrogen and the polymers isolated by precipitation with methanol, according to Example 2 of U.S. Pat. No. 4,391,950. A 1% solution of this PPE resin showed an absorption at 420 nm of 0.04 in a 1 cm cell.

To simulate the direct isolation by concentration, a 50% toluene solution of this PPE resin was mixed with 1% by weight $BH_3.N(CH_3)_3$ and heated at 300° C. for 30 minutes. The UV absorption of the product obtained is shown in Table 2.

Comparison Example D

A PPE solution was prepared according to Example 3. In contrast to Example 3, the PPE resin was not mixed with a boron compound.

TABLE 2

Comparison of the UV absorption of polyphenylene ethers treated with $BH_3.N(CH_3)_3$ and untreated (measured in 2% solution in chloroform at 420 nm in a 1 cm cell)

| Ex. | Pretreatment reduction w/ | Posttreatment | UV absorption |
| --- | --- | --- | --- |
| 2 | $Na_2S_2O_3$ | addition of 1% by weight of $BH_3.N(CH_3)_3$ | 0.12 |
| C | $Na_2S_2O_3$ | — | 0.5 |
| 3 | $H_2$ | addition of 1% by weight of $BH_3.N(CH_3)_3$ | 0.09 |
| D | $H_2$ | — | 0.45 |

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for producing polyphenylene ethers with a low content of visible light absorbing components, comprising the steps of:
   (i) oxidatively coupling a phenol in the presence of a catalyst comprising a metal-amine complex;
   (ii) terminating said coupling reaction;
   (iii) removing said catalyst from the coupling reaction solution; and
   (iv) contacting said reaction solution with a boron-containing reducing agent.

2. The process of claim 1, wherein said boron-containing reducing agent is selected from the group consisting of $B_2H_6$, $(BH_2R)_2$ wherein R is $C_{1-6}$ alkyl; and $BH_3.X$, wherein X is selected from the group consisting of dimethylsulfide, furan, morpholine, pyridine, ammonia, $C_{1-12}$ aliphatic primary amines, $C_{1-12}$ aliphatic secondary amines, $C_{1-12}$ aliphatic tertiary amines, triphenylphosphine and trialkylphosphines comprising $C_{1-12}$ alkyl groups.

3. The process of claim 1, wherein said boron-containing reducing agent is selected from the group consisting of $BH_3.N(CH_3)_3$ and $BH_3.N(C_2H_5)_3$.

4. The process of claim 1, wherein said phenol is an o,o'-dialkylphenol comprising $C_{1-6}$ alkyl groups.

5. The process of claim 4, wherein said dialkylphenol is 2,6-dimethylphenol.

6. The process of claim 4, wherein said phenol is substituted in the 3- or 5-position by a methyl group.

7. The process of claim 1, wherein 0.05–5% of said boron-containing reducing agent is added relative to the weight of said polyphenylene ether.

8. The process of claim 7, wherein 0.1–2% of said boron-containing reducing agent is added.

9. The process of claim 1, wherein said contacting step is performed for between 1–60 minutes.

* * * * *